(12) United States Patent
Perko et al.

(10) Patent No.: US 10,030,611 B2
(45) Date of Patent: Jul. 24, 2018

(54) FUEL DELIVERY SYSTEM

(71) Applicant: Caterpillar Inc., Peoria, IL (US)

(72) Inventors: Joshua Thomas Perko, Washington, IL (US); Roderick Scott Zehrung, Decatur, IL (US); Matthew Jordan Engfehr, Dunlap, IL (US)

(73) Assignee: Caterpillar Inc., Deerfield, IL (US)

( * ) Notice: Subject to any disclaimer, the term of this patent is extended or adjusted under 35 U.S.C. 154(b) by 175 days.

(21) Appl. No.: 15/229,558

(22) Filed: Aug. 5, 2016

(65) Prior Publication Data

US 2016/0341152 A1 Nov. 24, 2016

(51) Int. Cl.
*F02M 37/00* (2006.01)
*F02M 21/02* (2006.01)
*F02M 21/06* (2006.01)

(52) U.S. Cl.
CPC .... *F02M 21/0239* (2013.01); *F02M 21/0215* (2013.01); *F02M 21/0224* (2013.01); *F02M 21/0242* (2013.01); *F02M 21/06* (2013.01); *Y02T 10/32* (2013.01)

(58) Field of Classification Search
CPC ........... F02M 21/0239; F02M 21/0215; F02M 21/0224; F02M 21/0242; F02M 21/06; Y02T 10/32
USPC .................................................. 123/514, 557
See application file for complete search history.

(56) References Cited

U.S. PATENT DOCUMENTS

| 5,571,231 | A | 11/1996 | Lee | |
|---|---|---|---|---|
| 6,125,637 | A | 10/2000 | Bingham et al. | |
| 7,954,477 | B2 * | 6/2011 | Gruber | F02D 19/087 |
| | | | | 123/381 |
| 8,695,357 | B2 | 4/2014 | Brook et al. | |
| 8,733,324 | B2 * | 5/2014 | Blizard | F02M 55/02 |
| | | | | 123/468 |
| 8,763,565 | B2 | 7/2014 | Dunn et al. | |
| 8,960,161 | B2 * | 2/2015 | Bartsch | F02M 37/0029 |
| | | | | 123/514 |
| 9,291,309 | B2 | 3/2016 | Gupta et al. | |
| 2012/0048881 | A1 | 3/2012 | Drube et al. | |
| 2012/0060516 | A1 | 3/2012 | Lee et al. | |
| 2013/0220429 | A1 | 8/2013 | Batenburg et al. | |
| 2014/0130522 | A1 * | 5/2014 | Steffen | F17C 9/02 |
| | | | | 62/48.1 |
| 2014/0174106 | A1 | 6/2014 | Tang et al. | |
| 2014/0299101 | A1 * | 10/2014 | Melanson | F17C 5/06 |
| | | | | 123/445 |

* cited by examiner

*Primary Examiner* — Marguerite McMahon

(57) ABSTRACT

A fuel delivery system for an engine is provided. The fuel delivery system includes a tank, a temperature sensor, a delivery conduit, a return conduit, a heat exchanger, a first valve, a second valve, an accumulator, and a controller. The controller is configured to receive a signal indicative of a temperature of a fuel present within the tank. The controller is also configured to control at least one of the first valve and the second valve to selectively bypass at least a portion of the fuel to the tank through the return conduit and the accumulator based, at least in part, on the received signal. The portion of the fuel is adapted to raise the temperature of the fuel present within the tank.

9 Claims, 3 Drawing Sheets

FUEL DELIVERY SYSTEM

TECHNICAL FIELD

The present disclosure relates to a fuel delivery system. More particularly, the present disclosure relates to the fuel delivery system for an engine.

BACKGROUND

Engines, such as spark ignition engines, compression ignition dual fuel engines, and so on, employ a fuel such as Liquefied Natural Gas (LNG) for combustion. Such engines depend on a pressure within a fuel/LNG tank thereof to provide adequate flow of the fuel in order to eliminate a need for an additional fuel/cryogenic pump.

During refueling of the LNG tank, a temperature of the LNG tank may reduce mainly due to low temperature of an incoming supply of the LNG. As a result, a pressure within the LNG tank may be reduced proportionately. Also, during operation of the engine, as the LNG is consumed, a volume of the LNG within the LNG tank may reduce in turn resulting in a drop in the pressure within the LNG tank. In such situations, the pressure of the fuel supplied to the engine may be reduced below a specified threshold resulting in reduced or undesirable performance of the engine.

U.S. Pat. No. 6,125,637 describes a fuel delivery system having a fuel tank configured to receive liquid natural gas. The system includes a first conduit extending from a vapor holding portion of the fuel tank to an economizer valve. The system includes a second conduit extending from a liquid holding portion of the fuel tank to the economizer valve. The system includes a vaporizer coupled to the economizer valve. The vaporizer is heated by a coolant from an engine and is positioned below the fuel tank. The economizer valve selectively withdraws either liquid natural gas or vaporized natural gas from the fuel tank depending on a pressure within the vapor holding portion of the fuel tank. The system also includes a delivery conduit extending from the vaporizer to the engine. The system further includes a return conduit having a check valve formed therein extending from the delivery conduit to the vapor holding portion of the fuel tank for pressurizing the fuel tank.

SUMMARY OF THE DISCLOSURE

An aspect of the present disclosure provides a fuel delivery system for an engine. The fuel delivery system includes a tank adapted to store a fuel. The system includes a temperature sensor provided in association with the tank. The temperature sensor is configured to generate a signal indicative of a temperature of the fuel present within the tank. The system includes a delivery conduit coupled to the tank and the engine. The system includes a heat exchanger coupled to the delivery conduit downstream of the tank. The system includes a first valve coupled to the delivery conduit downstream of the heat exchanger. The first valve is adapted to control a flow of the fuel from the heat exchanger to the engine. The system includes a return conduit coupled to the delivery conduit and the tank. The return conduit is coupled to the delivery conduit downstream of the tank and upstream of the heat exchanger. The system includes a second valve coupled to the return conduit. The system also includes an accumulator coupled to the return conduit downstream of the second valve and upstream of the tank. The system further includes a controller coupled to the temperature sensor, the first valve, and the second valve. The controller is configured to receive the signal indicative of the temperature of the fuel present within the tank. The controller is also configured to control at least one of the first valve and the second valve to selectively bypass at least a portion of the fuel to the tank through the return conduit and the accumulator based, at least in part, on the received signal. The accumulator is adapted to convert the portion of the fuel from a liquid state to a gaseous state. The portion of the fuel is adapted to raise the temperature of the fuel present within the tank.

Other features and aspects of this disclosure will be apparent from the following description and the accompanying drawings.

DETAILED DESCRIPTION

Figure 1:
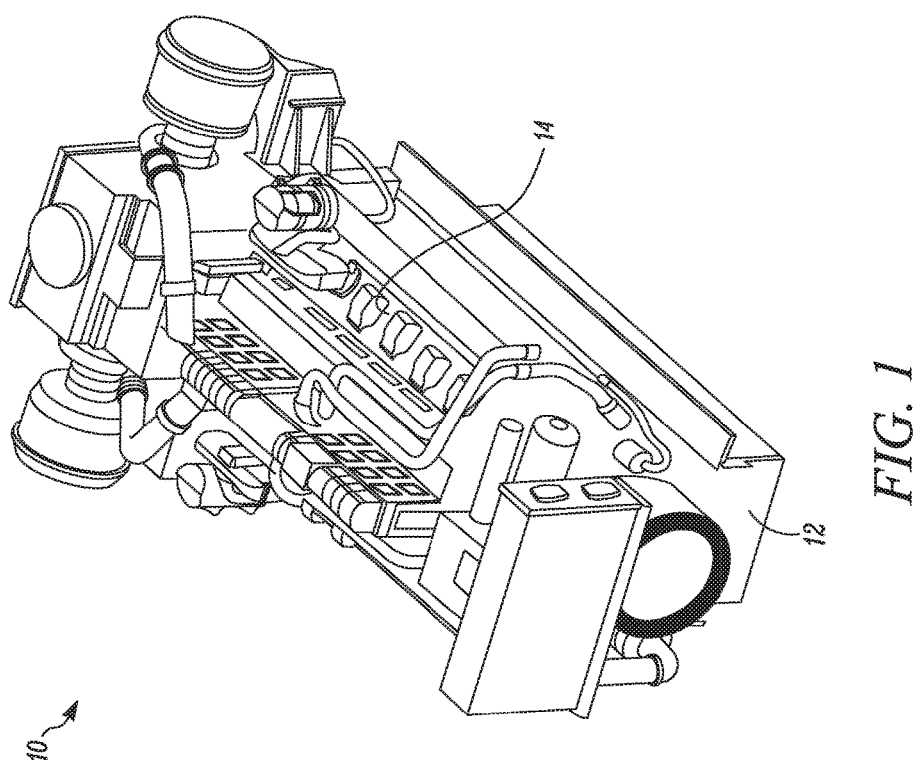
FIG. 1 is a perspective view of an exemplary engine, according to one embodiment of the present disclosure.

Wherever possible, the same reference numbers will be used throughout the drawings to refer to the same or the like parts. Referring to FIG. 1, an exemplary engine 10 is illustrated. The engine 10 is an internal combustion engine powered by one or more fuels. In one embodiment, the engine 10 may be a spark ignition engine powered by Liquefied Natural Gas (LNG).

In another embodiment, the engine 10 may be a compression ignition dual fuel engine powered by a combination of LNG and diesel, such as in a Dynamic Gas Blending (DGB) engine. The engine 10 may be used for applications including, but not limited to, power generation, transportation, construction, agriculture, forestry, aviation, marine, material handling, and waste management.

The engine 10 includes an engine block 12. The engine block 12 includes one or more cylinders (not shown) provided therein. The cylinders may be arranged in any configuration such as inline, radial, "V", and so on. The engine 10 also includes a cylinder head 14 mounted on the engine block 12. The cylinder head 14 houses one or more components and/or systems (not shown) of the engine 10 such as a valve train, an intake manifold, an exhaust manifold, sensors, and so on. Additionally, the engine 10 may include various other components and/or systems (not shown) such as a crankcase, a lubrication system, an air system, a cooling system, a turbocharger, an exhaust gas recirculation system, an exhaust gas aftertreatment system, other peripheries, and so on.

Figure 2:
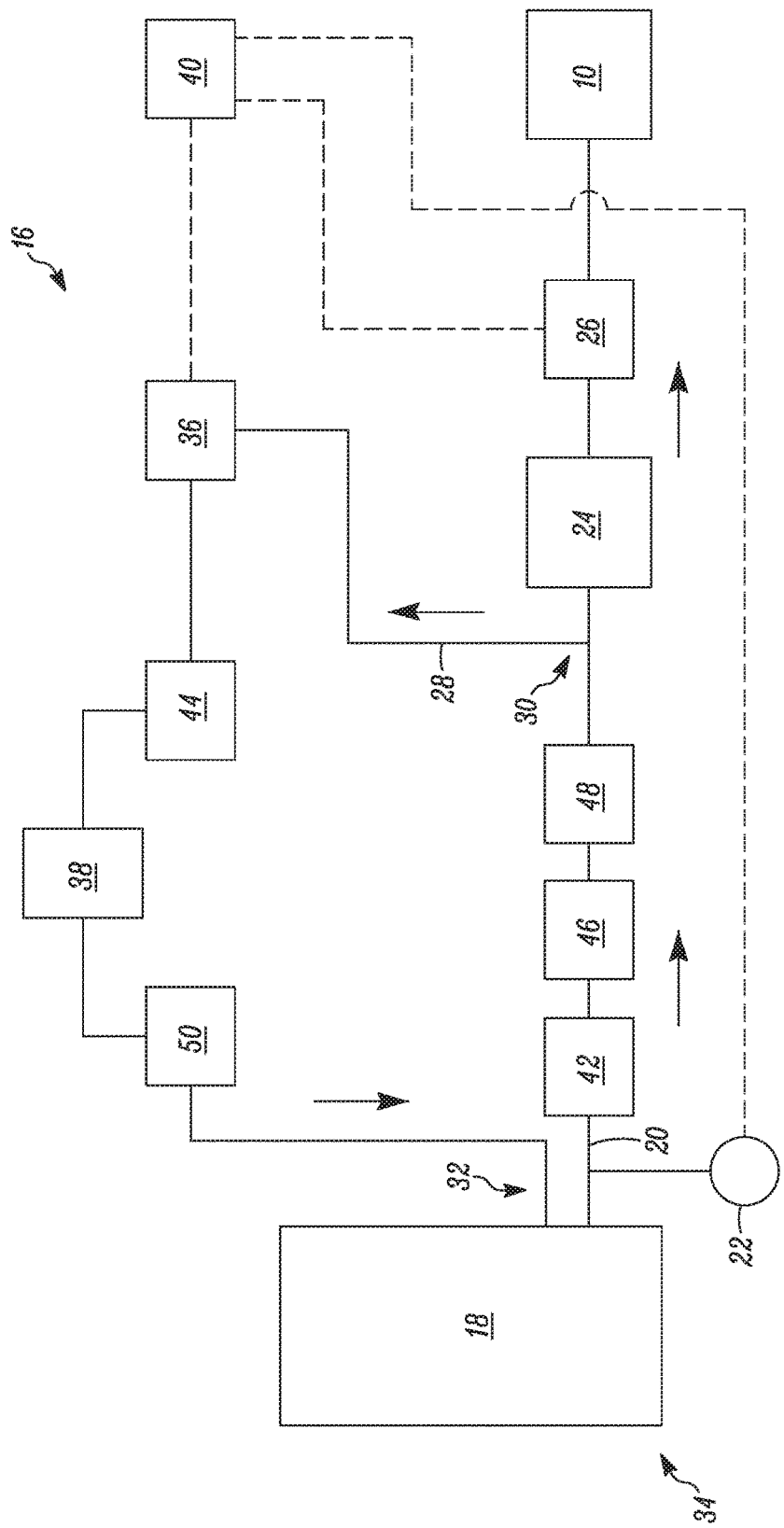
FIG. 2 is a schematic representation of a fuel delivery system for the engine of FIG. 1, according to one embodiment of the present disclosure.

Referring to FIG. 2, the engine 10 includes a fuel delivery system 16. The fuel delivery system 16 includes a tank 18. The tank 18 is adapted to store the LNG fuel hereinafter referred to as "the fuel". The tank 18 may be any tank known in the art adapted for cryogenic applications. As such, the tank 18 may include an insulation (not shown) thereon for limiting heat transfer between the fuel therein and atmosphere.

The fuel delivery system 16 includes a delivery conduit 20. The delivery conduit 20 is coupled to the tank 18 and the engine 10. The delivery conduit 20 is adapted to provide a flow of the fuel from the tank 18 to the cylinders of the engine 10. The fuel delivery system 16 includes a temperature sensor 22 provided in association with the tank 18.

In the illustrated embodiment, the temperature sensor 22 is coupled to the delivery conduit 20 adjacent to the tank 18. In other embodiments, the temperature sensor 22 may be coupled to the tank 18. The temperature sensor 22 is configured to generate a signal indicative of a temperature of the fuel present within the tank 18. The temperature sensor 22 may be any temperature sensor known in the art adapted for cryogenic applications.

The fuel delivery system 16 includes a heat exchanger 24 also known as a vaporizer. The heat exchanger 24 is coupled to the delivery conduit 20. More specifically, the heat exchanger 24 is provided downstream of the tank 18 and upstream of the engine 10. The heat exchanger 24 is adapted to receive the fuel from the tank 18 and convert the fuel from a liquid state to a gaseous state. More specifically, the heat exchanger 24 is adapted to receive the LNG from the tank 18 and convert the LNG to vaporized natural gas.

The heat exchanger 24 may be any heat exchanger known in the art adapted for cryogenic applications. In one embodiment, the heat exchanger 24 may be an ambient air-to-liquid type of heat exchanger adapted to transfer heat between ambient air and the fuel. In another embodiment, the heat exchanger 24 may be a liquid-to-liquid type of heat exchanger adapted to transfer heat between a fluid and the fuel. The fluid may be a heated engine coolant, engine oil, hydraulic oil, and so on.

The fuel delivery system 16 includes a first valve 26 coupled to the delivery conduit 20. More specifically, the first valve 26 is provided downstream of the heat exchanger 24 and upstream of the engine 10. The first valve 26 is adapted to control a flow of the fuel/vaporized natural gas from the heat exchanger 24 to the engine 10. The first valve 26 may be any valve known in the art adapted for controlling flow of gaseous fluids.

The fuel delivery system 16 includes a return conduit 28. The return conduit 28 is coupled to the delivery conduit 20 and the tank 18. More specifically, a first end 30 of the return conduit 28 is coupled to the delivery conduit 20 downstream of the tank 18 and upstream of the heat exchanger 24. The return conduit 28 is adapted to provide a flow of at least a portion of the fuel from the delivery conduit 20 to the tank 18. Also, a second end 32 of the return conduit 28 is coupled to the tank 18 at a lower portion 34 thereof and will be explained in more detail later.

The fuel delivery system 16 includes a second valve 36 coupled to the return conduit 28. The second valve 36 is adapted to control the flow of the portion of the fuel from the delivery conduit 20 to the tank 18. The second valve 36 may be any valve known in the art adapted for controlling flow of a fluid and adapted for cryogenic applications.

The fuel delivery system 16 also includes an accumulator 38 coupled to the return conduit 28. More specifically, the accumulator 38 is provided downstream of the second valve 36 and upstream of the tank 18. The accumulator 38 is adapted to receive the portion of the fuel from the second valve 36. The accumulator 38 will be explained in more detail later.

The fuel delivery system 16 further includes a controller 40. The controller 40 is coupled to the temperature sensor 22, the first valve 26, and the second valve 36. The controller 40 is configured to receive the signal indicative of the temperature of the fuel present within the tank 18 from the temperature sensor 22.

The controller 40 is also coupled to an engine parameter sensor (not shown) associated with the engine 10. The engine parameter sensor is configured to generate a signal indicative of an engine operating parameter. The engine operating parameter may be any engine operating condition such as a fuel command, a throttle command, and so on, and may vary based on application requirements. In other embodiments, the controller 40 may receive the signal indicative of the engine operating parameter from an Engine Control Module (ECM) (not shown) associated with the engine 10.

Accordingly, the controller 40 is configured to receive the signal indicative of the engine operating parameter. Based on the received signal indicative of the engine operating parameter, the controller 40 is configured to determine an appropriate time period/duration to selectively bypass the portion of the fuel to the tank 18 through the return conduit 28 and the accumulator 38. As such, it may be desirable to bypass the portion of the fuel under specific engine operating conditions in order to ensure a demand of the engine 10 is met.

The controller 40 is also configured to control at least one of the first valve 26 and the second valve 36 to selectively bypass the portion of the fuel to the tank 18 through the return conduit 28 and the accumulator 38 based, at least in part, on the received signal. More specifically, the controller 40 is configured to control the first valve 26 and/or the second valve 36 to selectively bypass the portion of the fuel to the accumulator 38 through the return conduit 28 based on the signals received from the temperature sensor 22. The portion of the fuel is adapted to raise the temperature of the fuel present within the tank 18.

During operation of the fuel delivery system 16, the controller 40 receives the signal indicative of the temperature of the fuel present within the tank 18 from the temperature sensor 22. Based on the received signal, the controller 40 determines a pressure within the tank 18. The controller 40 may determine the pressure within the tank 18 based on a correlation. The correlation may be stored in a memory (not shown) of the controller 40 or a database (not shown) coupled to the controller 40.

In one situation, the correlation may be a dataset. The dataset may include various values of the pressure within the tank 18 for different values of the temperature of the fuel present within the tank 18. In another situation, the correlation may be a mathematical expression between the temperature of the fuel within the tank 18 and the pressure within the tank 18. Accordingly, the controller 40 may look up the dataset or refer the mathematical expression in order to determine the pressure within the tank 18 based on the temperature of the fuel present within the tank 18.

In a situation when the temperature of the fuel present within the tank 18 may drop below a threshold temperature, the controller 40 controls the first valve 26 and the second valve 36 to bypass the portion of the fuel from the delivery conduit 20 to the accumulator 38. The threshold temperature may be such that the pressure within the tank 18 at the threshold temperature may be approximately equal or exceed a boost pressure of the engine 10.

More specifically, the controller 40 closes the first valve 26 partially or completely, based on application requirements which may also include the signal indicative of the engine operating parameter, to bypass the portion or complete flow of the fuel respectively through the return conduit 28 to the accumulator 38. Simultaneously, the controller 40 opens the second valve 36 partially or completely, based on application requirements which may also include the signal indicative of the engine operating parameter, to bypass the portion or complete flow of the fuel respectively through the return conduit 28 to the accumulator 38.

The accumulator 38 may be any hollow, closed vessel having little or no insulation thereon and adapted for cryogenic applications. Accordingly, the portion of the fuel received therein transfers heat with atmosphere and converts the fuel from a liquid state to a gaseous state. More specifically, the accumulator 38 is adapted to receive the LNG and convert the LNG to vaporized natural gas.

The vaporized natural gas is further provided at the lower portion 34 of the tank 18 through the return conduit 28. Accordingly, the vaporized natural gas is bubbled and mixed with the fuel/LNG present within the tank 18. Due to heat transfer between the vaporized natural gas and the fuel present within the tank 18, the temperature of the fuel present within the tank 18 increases gradually. As a result, the pressure within the tank 18 also increases proportionately. As the temperature of the fuel present within the tank 18 may be approximately equal or higher than the threshold temperature, the controller 40 is adapted to control the first valve 26 and/or the second valve 36 to terminate the bypass of the fuel to the accumulator 38.

More specifically, the controller 40 opens the first valve 26 partially or completely, based on application requirements which may also include the signal indicative of the engine operating parameter, to provide the flow of the vaporized natural gas from the heat exchanger 24 further to the engine 10. Simultaneously, the controller 40 closes the second valve 36 partially or completely, based on application requirements which may also include the signal indicative of the engine operating parameter, to reduce or terminate the bypass of the portion or complete flow of the fuel respectively through the return conduit 28 to the accumulator 38. As a result, a flow of the vaporized natural gas from the accumulator 38 to the tank 18 may also be terminated.

Additionally, the fuel delivery system 16 includes a first check valve 42 coupled to the delivery conduit 20. The first check valve 42 is provided downstream of the tank 18 and upstream of the heat exchanger 24. The first check valve 42 is adapted to control a reverse flow of the fuel from the heat exchanger 24 and/or the second valve 36 towards the tank 18. The fuel delivery system 16 includes a second check valve 44 coupled to the return conduit 28. The second check valve 44 is provided downstream of the second valve 36 and upstream of the accumulator 38. The second check valve 44 is adapted to control a reverse flow of the fuel and/or vaporized natural gas from the accumulator 38 towards the second valve 36 and/or the delivery conduit 20.

The fuel delivery system 16 includes an Excess Flow (EF) valve 46 coupled to the delivery conduit 20. The EF valve 46 is provided downstream of the first check valve 42 and upstream of the heat exchanger 24. The EF valve 46 is adapted to control a flow rate of the fuel from the tank 18 towards the heat exchanger 24. The fuel delivery system 16 also includes a Shut-Off (SO) valve 48 coupled to the delivery conduit 20. The SO valve 48 is provided downstream of the first check valve 42 and upstream of the heat exchanger 24. More specifically, the SO valve 48 is provided downstream of the EF valve 46 and upstream of the heat exchanger 24. The SO valve 48 is adapted to manually control the flow of the fuel from the tank 18 towards the heat exchanger 24.

The fuel delivery system 16 further includes a third valve 50 coupled to the return conduit 28. More specifically, third valve 50 is provided downstream of the accumulator 38 and upstream of the tank 18. The third valve 50 is adapted to operate at a predetermined pressure value. Accordingly, the third valve 50 may be any pressure regulated valve known in the art adapted for controlling flow of gaseous fluids.

More specifically, as an amount of the vaporized natural gas may increase within the accumulator 38, due to heat transfer between the fuel therein and the atmosphere, a pressure within the accumulator 38 may also increase. As the pressure within the accumulator 38 exceeds the predetermined pressure value, the third valve 50 opens in order to allow the flow of the vaporized natural gas from the accumulator 38 to the tank 18.

The first check valve 42, the second check valve 44, the EF valve 46, and/or the SO valve 48 may be any valve known in the art adapted for respective cryogenic applications. It should be noted that a number, configuration, and/or layout of the first check valve 42, the second check valve 44, the EF valve 46, and/or the SO valve 48 described herein is merely exemplary. Based on application requirements, the fuel delivery system 16 may omit components described herein and/or may include additional components not described herein without limiting the scope of the disclosure.

INDUSTRIAL APPLICABILITY

Figure 3:
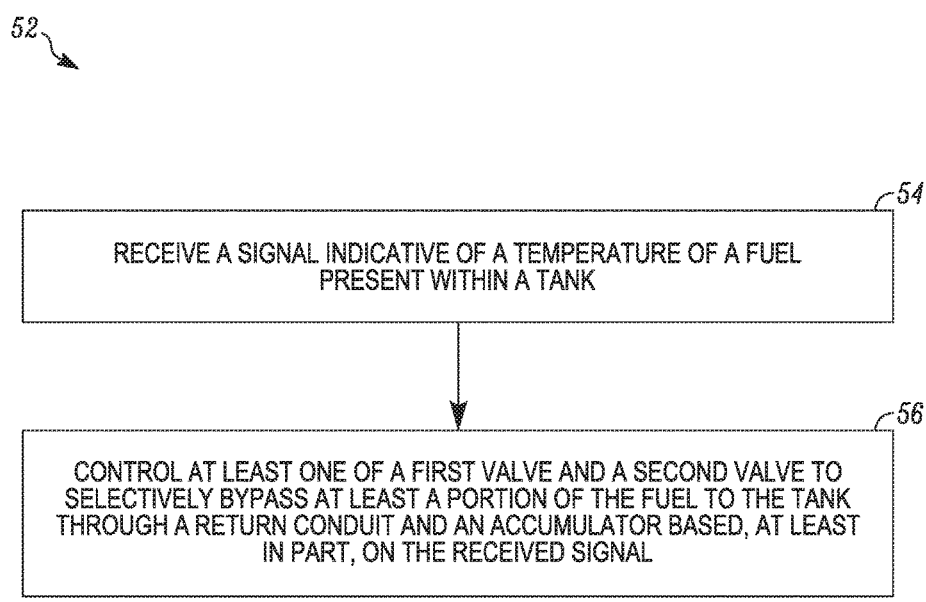
FIG. 3 is a flowchart of a method of working of the fuel delivery system of FIG. 2, according to one embodiment of the present disclosure.

The present disclosure relates to the fuel delivery system 16. Referring to FIG. 3, a method 52 of working of the fuel delivery system 16 is illustrated. At step 54, the controller 40 receives the signal indicative of the temperature of the fuel present within the tank 18 from the temperature sensor 22. At step 56, the controller 40 controls at least one of the first valve 26 and the second valve 36 to selectively bypass the portion of the fuel to the tank 18 through the return conduit 28 and the accumulator 38 based, at least in part, on the received signal. The portion of the fuel is adapted to raise the temperature of the fuel present within the tank 18.

The fuel delivery system 16 provides a simple, effective, and cost efficient method for controlling the pressure within the tank 18 and, in turn, the pressure of the vaporized natural gas provided to the engine 10. The fuel delivery system 16 eliminates need for an additional boost/pressure pump, thus, lowering system cost and complexity. The fuel delivery system 16 may be incorporated in other engines 10 with minor modification to the existing fuel system.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:

1. A fuel delivery system for an engine, the fuel delivery system comprising:
  a tank adapted to store a fuel;
  a temperature sensor provided in association with the tank, the temperature sensor configured to generate a signal indicative of a temperature of the fuel present within the tank;
  a delivery conduit coupled to the tank and the engine;
  a heat exchanger coupled to the delivery conduit downstream of the tank;
  a first valve coupled to the delivery conduit downstream of the heat exchanger, the first valve adapted to control a flow of the fuel from the heat exchanger to the engine;

a return conduit coupled to the delivery conduit and the tank, the return conduit coupled to the delivery conduit downstream of the tank and upstream of the heat exchanger;

a second valve coupled to the return conduit;

an accumulator coupled to the return conduit downstream of the second valve and upstream of the tank; and a controller coupled to the temperature sensor, the first valve, and the second valve, the controller configured to:

receive the signal indicative of the temperature of the fuel present within the tank; and control at least one of the first valve and the second valve to selectively bypass at least a portion of the fuel to the tank through the return conduit and the accumulator based, at least in part, on the received signal, wherein the accumulator is adapted to convert the portion of the fuel from a liquid state to a gaseous state, and wherein the portion of the fuel is adapted to raise the temperature of the fuel present within the tank.

2. The fuel delivery system of claim 1, wherein the controller is further configured to receive a signal indicative of an engine operating parameter from at least one of an engine parameter sensor and an Engine Control Module (ECM) associated with the engine.

3. The fuel delivery system of claim 2, wherein the engine operating parameter includes a fuel command.

4. The fuel delivery system of claim 1, wherein the fuel is Liquefied Natural Gas (LNG).

5. The fuel delivery system of claim 1 further includes a check valve coupled to the delivery conduit downstream of the tank and upstream of the return conduit.

6. The fuel delivery system of claim 5 further includes an Excess Flow (EF) valve coupled to the delivery conduit downstream of the check valve and upstream of the return conduit.

7. The fuel delivery system of claim 5 further includes a Shut-Off (SO) valve coupled to the delivery conduit downstream of the check valve and upstream of the return conduit.

8. The fuel delivery system of claim 1 further includes a check valve coupled to the return conduit downstream of the second valve and upstream of the accumulator.

9. The fuel delivery system of claim 1 further includes a third valve coupled to the return conduit downstream of the accumulator and upstream of the tank.

* * * * *